May 8, 1962     J. M. CAHILL     3,033,028
ANALYTICAL APPARATUS
Filed Dec. 18, 1958
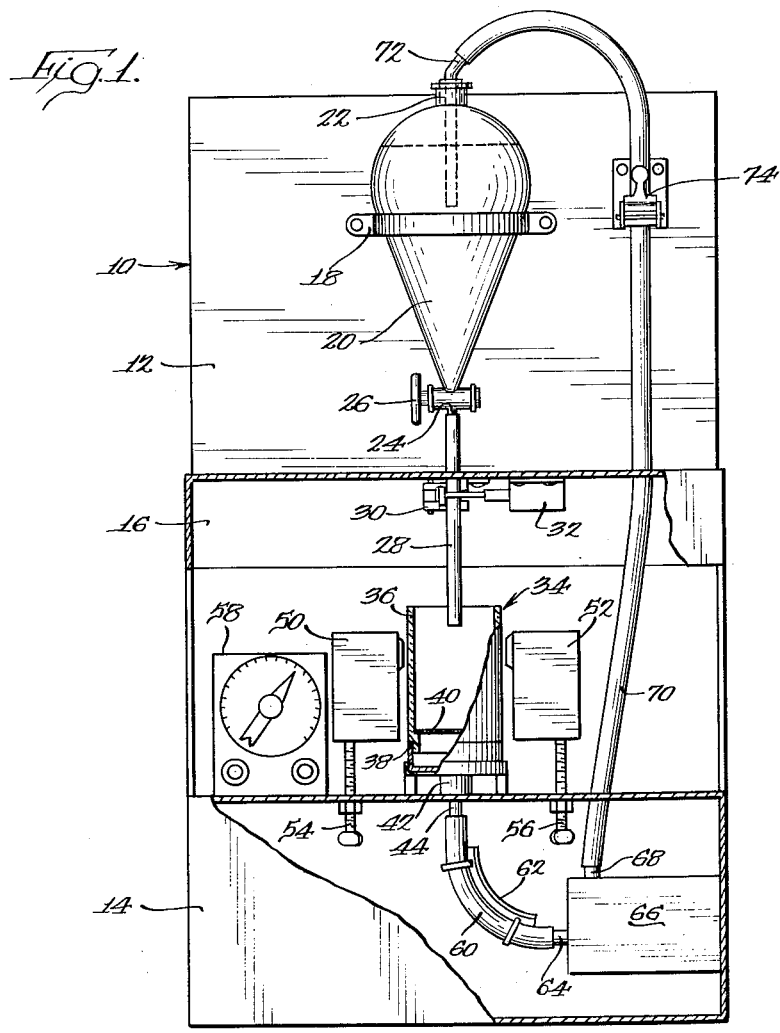
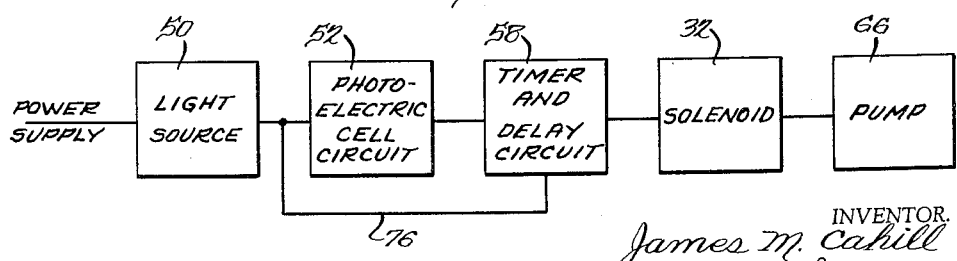
INVENTOR.
James M. Cahill

United States Patent Office 3,033,028
Patented May 8, 1962

3,033,028
ANALYTICAL APPARATUS
James M. Cahill, Park Forest, Ill., assignor to Libby, McNeill & Libby, Chicago, Ill., a corporation of Maine
Filed Dec. 18, 1958, Ser. No. 781,309
11 Claims. (Cl. 73—61)

The present invention relates to analytical processes and apparatus for performing the same, and particularly to improved apparatus for extracting filth from food products for microscopic analysis.

In the food industry, it is essential that accurate control be maintained over product purity. This is especially true in the case of canned vegetables and like goods, and it is necessary that a constant check be made on the purity of the raw product prior to canning. For this reason, it has been conventional in the art to analyze, for instance, tomatoes for fly eggs and maggots, broccoli and sauerkraut for insect parts, etc. By way of example, the standard test for fly eggs and maggots, as established by the Association of Official Agricultural Chemists, resides in mixing 100 grams of the comminuted product with 20 to 30 milliliters of gasoline in a separator, shaking the mixture thoroughly, filling the separator with water in such manner as to produce mass agitation, allowing the mixture to settle, draining a 15 to 20 milliliter sample from the separator at 15 minute intervals during a period of one hour, shaking the mixture remaining in the separator after each withdrawal, filtering the accumulation of samples, and examining the particles left on the filter at a magnification of about 10 times. If the samples accumulated in the course of one hour reveal the presence of filth, e.g. maggots or eggs, the draining, filtering and examining steps are continued for an additional hour.

By virtue of the described procedure, the fibrous material of the vegetable is picked up by the gasoline and floated to the top of the separator, while the filth, such as fly eggs, settles to the bottom where it can be drawn off with the water, filtered out and examined. If there is no filth in the vegetable matter, that of course will be revealed.

While this test is highly effective, it suffers the major disadvantage of requiring an excessive amount of time and energy for its performance. Specifically, at least four samples must be withdrawn, each sample must be taken from the separator only after agitation of the mixture, and the mixture must be permitted to settle at least 15 minutes after agitation before a sample is withdrawn. Consequently, the test requires at least one hour and frequently two hours for its performance, and the technician must perform each of the steps of agitating and withdrawing at least four times during the course of each hour.

The object of the present invention is to simplify the procedure involved in testing for filth in food products, and to reduce to a minimum the manipulative steps and the elapsed time of the test.

More particularly, it is an object of the invention to eliminate from the above described test procedure the necessity for settling time, yet without decreasing the exactitude and reliability of the test.

To this end, it is an object of the invention to provide for a food product testing procedure wherein a plurality of samples drawn from the bottom of a gasoline-water-product mixture of the character above described are passed in sequence through a single filter in the presence of additional gasoline, the filter is back-flushed in the presence of the additional gasoline after each sample has been filtered, and this single filter is the only one examined after the several samples have been passed therethrough, the steps of withdrawing, filtering, and back-flushing being repeated in immediate succession without delay therebetween; by means of which procedure test results at least equally as accurate as those of the aforesaid standard test may conveniently be obtained in only twelve minutes and with considerably less effort.

In addition, I prefer to include in the improved food product testing procedure described the steps of re-introducing part of the filtrate from each sample into the initial gasoline-water-product mixture to produce a limited and gentle agitation of the fibrous matter therein to encourage separation of filth adhering to the fibers, and of utilizing the remainder of the filtrate from each sample for effecting back-flushing of the filter, thereby further to speed up the procedure and enhance the accuracy of its results.

It is, moreover, a principal object of this invention to provide improved apparatus for performing the described test procedure automatically and with precision.

In particular, it is an object of the invention to provide improved apparatus for performing analytical processes comprising a specimen flask, a sample cup, means for transferring samples from said flask to said cup, a filter in said cup, means for draining said cup from below said filter and for causing back surge of part of the filtrate at the completion of draining, and control means responsive to filling of said cup for rendering said transferring means inoperative and said draining means operative and responsive to predetermined operation of said draining means for rendering said draining means inoperative, thereby to cause back-flushing of said filter, and for rendering said transferring means operative, whereby the sample cup is alternately filled with and substantially emptied of samples drained from said flask, each sample is drawn through said filter, and part of the filtrate from each sample is caused to surge back into said cup to back-flush the filter therein.

A further object of the invention is the provision of improved apparatus for performing analytical processes comprising, in the preferred embodiment thereof, a specimen flask having a gravity drain, a valve for opening and closing said drain, a sample cup below said drain for receiving samples from said flask, a filter in said cup, a pump having its inlet connected to said cup below said filter and its outlet communicating with the interior of said flask above said cup, and control means responsive to filling of said cup to a predetermined degree for closing said valve and setting said pump in operation and responsive to predetermined operation of said pump for stopping said pump and opening said valve.

By virtue of this apparatus, upon introduction of the gasoline-water-product mixture into the flask and introduction of some gasoline into the sample cup, the above outlined test procedure can readily be completed in 12 minutes, during which time 30 to 40 samples are filtered and the attending technician has been required to do no more than prepare the specimen, fill the flask, set the apparatus in operation, and remove and examine the filter. Yet, I have found the results to be fully the equivalent of the involved and time consuming standard test heretofore practiced.

These and other advantages and objects of the invention will become more fully apparent in the following detailed description.

Now, in order to acquaint those skilled in the art with the manner of making and using the apparatus of the invention and with the manner of practicing the improved test procedure, I shall describe, in connection with the accompanying drawing, a preferred embodiment of the apparatus of my invention and the preferred manner of use thereof in carrying out the improved test procedure.

In the drawing:

FIGURE 1 is a front view, partly in section and partly in elevation, of the preferred embodiment of the apparatus of the invention; and FIGURE 2 is a schematic block diagram of the components of the control circuit of said apparatus.

Referring now to the drawings, and particularly to FIGURE 1, I have shown a preferred embodiment of the apparatus of my invention. In this embodiment, the components of the apparatus are mounted on and in a test stand 10 comprising a vertical back plate 12, a lower compartment or box 14 extending forwardly from the plate 12 and constituting the pedestal of the stand, and a compartment or box 16 extending forwardly from an intermediate portion of the plate 12 in upwardly spaced relation to the lower compartment or box 14.

Mounted on the back plate 12 adjacent the upper end thereof is a bracket 18 adapted to support a conventional form of test flask 20. This flask includes a stoppered inlet 22 at its upper end, a gravity drain 24 at its lower end and a pet cock 26 for manually opening and closing the drain. Depending from the flask is a rubber or like flexible tube 28 with which an automatic clamp 30 is associated. The clamp 30 is normally biased to open position thereby to maintain the tube 28 open, but is adapted to be actuated by a solenoid 32 to close the tube, whereby the clamp constitutes a valve for opening and closing the gravity drain of the flask. Preferably, the clamp 30 and solenoid 32 are enclosed within a housing, and it is for this purpose that the intermediate compartment 16 is provided.

Beneath the compartment 16, a sample cup 34 is rested on the upper surface of the lower compartment 14 in vertical alignment with the tube 28, the tube preferably entering into the upper portion of the cup. The construction of the cup 34 is not especially critical and the same can take such form as those skilled in the art may desire. In the embodiment of the invention illustrated herein, the cup has a transparent side wall 36 and an internal shoulder 38 or the like on which a filter 40 is rested. At its lower end, the cup includes a fitting 42, preferably a valved fitting, by means of which the cup can be placed in communication with a drain pipe 44 that is secured to and extends through the top wall of the compartment 14, the pipe preferably being provided with a valve (not shown) so that liquid will not be spilled on the apparatus when the cup 34 is removed therefrom. The type of filter employed likewise is not particularly critical, but I prefer to use a copper screen of about 100 to 140 mesh.

Disposed to opposite sides of the transparent portion 36 of the cup 34 are a light source 50 and a photoelectric cell 52, each including a threaded adjustment stem 54 and 56, respectively, extending through the upper wall of the compartment 14 to facilitate vertical adjustment of the light source and cell relative to the cup. Also mounted on the upper surface of the compartment 14 is a standard variable time delay device 58.

Within the compartment 14, a flexible hose or conduit 60, suitably supported by a hose brace 62, establishes communication between the conduit stem or drain pipe 44 and the inlet 64 of an electrically operated pump 66. The outlet 68 of this pump is connected by means of a flexible, vertically extending hose or conduit 70 with the interior of the flask 20, the hose preferably being slipped over the upper end of a glass tube 72 that extends through the flask stopper and a significant distance downwardly into the flask. Also, it is preferred that an adjustable clamp 74 be associated with the hose 70 to control the rate of flow therethrough, and thus the liquid transfer rate of the pump.

The pump 66 is a conventional type of radial discharge impeller pump having an axial inlet. Such pumps are well known and extensively used for various purposes. An example of such a pump well suited to the purposes of my invention is the pump shown in Patent No. 2,739,-536, issued March 27, 1956, to Edward J. Schaefer. When such a pump is in operation, the water or liquid flows into the impeller chamber axially thereof and is discharged radially through the outlet. When the pump stops, if the conduit or tube leading from the outlet contains water or liquid under pressure, back flow through the pump to the inlet thereof will occur, as will be understood.

The electric circuit for causing automatic operation of the described apparatus is illustrated schematically in FIGURE 2. As there represented, a conventional source of electric power normally energizes the light source 50 and the circuit of the photoelectric cell 52. The cell 52 in turn is responsive to discontinuance of the source of light therefor to close a series circuit from the power source to the circuit of the timer 58, to the solenoid 32 and to the electric operating means of the pump 66, whereupon the solenoid closes the valve 30 and the pump is set into operation. At the same time, the circuit of the timer 58 is activated to close a secondary circuit, indicated at 76, that by-passes the photoelectric cell and maintains a series connection of the power source to the solenoid and to the pump for the time interval for which the timer 58 is set. Thus, the circuit is maintained closed even after the liquid level falls below the level of the light source 50 and the photoelectric cell 52. When the time interval for which the timer is set elapses, the circuit is automatically opened, whereupon operation of the pump ceases and the valve 30 automatically opens the drain connection from the flask.

In use of the described apparatus for testing for filth in food products, I pour about 25 milliliters of gasoline into the sample cup 34. I then mix about 100 grams of a comminuted specimen of the product with 25 to 30 milliliters of gasoline and pour this mixture into the flask 20. The flask is then substantially filled with water, the water constituting the major portion of the contents of the flask. Upon adding the water, the gasoline floats to the top of the flask and carries with it the fibrous portions of the specimen, the filth embodied in the specimen settling toward the drain 24. The stopper is then inserted in the inlet 22 and the tube 72 adjusted so that its lower end projects into the water below the layer of gasoline. As a starting value, I have found it desirable initially to set the timer 58 for a time delay of about 5 seconds, although this may be varied dependent upon the fiber content of the specimen to afford more or less samplings in a given period of time. The light source 50 and the cell 52 are also adjusted to a level such that each sample will be of a predetermined quantity. In this respect, I prefer to take samples of 15 milliliters each, and accordingly I adjust the source 50 and cell 52 at the level where the light source will be cut off by the presence of about 40 milliliters of liquid in the cup, i.e., 25 milliliters of gasoline and a 15 milliliter sample. The apparatus is then ready for use, and it is started in operation by opening the pet cock 26 and turning on the power supply.

Upon opening of the pet cock 26, water, and any filth therein, is drained from the flask 20 into the cup 34, the water displacing the gasoline in the cup and causing any fibrous matter drained off with the water to be floated by the gasoline at the top of the liquid in the cup. When sufficient water (i.e. 15 milliliters) has been drained into the cup to cause the liquid level to rise above the horizontal level of the source of light and the photoelectric cell, the source of light for the cell is cut off and the cell causes the circuit to the solenoid 32 and to the pump 66 to be closed, whereupon the clamp 30 closes the drain opening of the flask and the pump starts to withdraw liquid from the cup 34. The pump then operates for about 5 seconds during which time substantially all of the 15 milliliter sample, but no sifinificant part of the gasoline, is drawn through the filter 40. The clamp 74 and/or the timer 58 is suitably adjusted to insure this result.

The pump thereupon causes part of the filtrate from the sample to be returned to the flask 20 via the conduits 70 and 72, the filtrate entering the flask below the level of the gasoline therein and producing a gentle agitation of the contents of the flask to encourage separation of filth from the fibrous matter of the specimen and cause settling of the filth. At the end of the five-second period, the pump is stopped whereupon there is a back surge of filtrate into the cup 34 and back through the filter 40 to effect back-flushing of the filter and removal therefrom of any fibrous matter that may inadvertently have come into contact with the filter. In that connection, the water column in tube 70 obviously is of much greater height than the opposing water column in hose 60 and cup 34. The pump 66 is a radial discharge impeller pump of conventional type having an axial inlet, as above stated. When pump 66 stops the predominating pressure of the liquid column in tube 70 causes a back surge of filtrate through pump 66 and into cup 34, as noted.

At the same time, the solenoid 32 is de-energized whereupon the clamp 30 opens the drain of the flask and permits another sample to flow into the cup 34, whereby the described sequence of operations is automatically repeated. Preferably, I maintain the apparatus in operation for about 12 minutes during which time 30 to 40 samples of 15 milliliters each are extracted from the flask and filtered.

After 12 minutes of operation have elapsed, I shut off the pet cock 26 and remove the sample cup 34 from the test stand. The pet cock may be shut off at any time, but if it is shut off at the completion of a draining cycle or during the filtering and back flushing cycles, it is desirable to permit these latter cycles to be completed so that the apparatus will automatically be conditioned to commence the next test. The power supply is then shut off and the test cup 34 removed from the stand. As the cup is being removed, the valve means of the fitting 42 and pipe 44 automatically close to prevent spilling of liquid and, in particular, to retain the liquid levels in the cup so that any fibrous material floated therein by the gasoline does not come into contact with the filter 40. The filter is then removed from the cup and it and the particles adhering thereto are examined, preferably under a binocular stereoscopic microscope at a magnification of about 10 times.

As a consequence of the described use of the illustrated apparatus, the test procedure is completed in only 12 minutes, one-fifth the time previously required, and imposes on the technician the simple task of making only one microscopic examination, as contrasted to the manifold manipulative steps heretofore required to be performed by him. Accordingly, it has been shown herein that all of the objects of the invention are attained in a convenient, economical and practical manner.

In view of the nature of the apparatus, it will be apparent to those skilled in the art that the same is open to substantial variation and modification. For example, the liquid level responsive means could readily comprise probes or other mechanical, electro-mechanical, or electrical sensing means, and such means could be provided for sensing predetermined maximum and minimum liquid levels to control the pump and drain valve as a consequence solely of variation in liquid level, rather than partly by elapse of time. In either case, however, the control means in effect is responsive to predetermined operation of the pump to stop the filtering cycle. Also, in view of the variations capable in sensing means, the sample cup could well be formed of wood, plastic, metal, etc., and need not be transparent. Similarly, the flask 20 could be formed of material other than glass and the tubing or hoses could be formed of any suitable composition; rubber, plastic, metal, etc. So also, the filter 40 could be formed of paper, cloth, leather, and the like, as well as screening.

Accordingly, while I have shown and described what I regard to be the preferred embodiment of the apparatus of my invention, and the preferred mode of testing for filth in food products, it will be appreciated that various changes, rearrangements and modifications may be made therein without departing from the scope of the invention, as defined by the appended claims.

I claim:
1. Apparatus for performing analytical processes comprising a specimen flask, a unitary sample cup, means for successively transferring a sample of predetermined amount from said flask to said cup, a filter in said cup, means for draining said cup from below said filter, and control means comprising means responsive to filling of said cup to predetermined height by said sample and effective for rendering said transferring means inoperative and said draining means operative and means for rendering said drainage means inoperative and said transferring means operative at the end of a predetermined period of time of operation of said draining means.

2. Apparatus for performing analytical processes comprising a specimen flask, a unitary sample cup, means for successively transferring a sample of predetermined amount from said flask to said cup, a stationary filter in said cup, means for draining said cup from below said filter and for causing back surge of part of the filtrate at the completion of draining, and control means comprising means responsive to filling of said cup to predetermined height by said sample and effective for rendering said transferring means inoperative and said draining means operative and means for rendering said draining means inoperative and thereby causing back-flushing of said filter and then rendering said transferring means operative, at the end of a predetermined period of time of operation of said draining means.

3. Apparatus for performing analytical processes comprising a specimen flask, a unitary sample cup, means for successively transferring a sample of predetermined amount from said flask to said cup, a stationary filter in said cup, means for draining said cup from below said filter and for transferring part of the filtrate back to said flask, and control means comprising means responsive to filling of said cup to predetermined height by said sample and effective for rendering said sample transferring means inoperative and said draining and filtrate transferring means operative and means for rendering said filtrate transferring means inoperative at the end of a predetermined period of time of operation thereof, causing the remainder of the filtrate to back-flush said filter, and then rendering said sample transferring means operative.

4. Apparatus for performing analytical processes comprising a specimen flask, a unitary sample cup, means for successively transferring a sample of predetermined amount from said flask to said cup, a stationary filter in said cup, a pump having an inlet communicating with said cup below said filter and an outlet communicating with said flask, and control means comprising means responsive to filling of said cup to predetermined height by said sample and effective for rendering said transferring means inoperative and said pump operative and means for rendering said pump inoperating and said transferring means operative at the end of a predetermined period of operation of said pump.

5. Apparatus for performing analytical processes comprising a specimen flask, a unitary sample cup, means for successively transferring a sample of predetermined amount from said flask to said cup, a filter in said cup, a pump having an inlet and an outlet, first conduit means establishing communication between said inlet of said pump and said cup below said filter, second conduit means establishing communication between said outlet of said pump and said flask, and control means comprising means responsive to filling of said cup to predetermined height by said sample and effective for rendering said transferring means inoperative and said pump operative and means for rendering said pump inoperative at the end of a predetermined period of time of operation thereof for causing a back surge of filtrate into said cup and through said filter upon cessation of operation of said pump and then rendering said transferring means operative.

6. Apparatus for performing analytical processes comprising a specimen flask having a gravity drain, a valve for opening and closing said drain, a unitary sample cup below said drain for successively receiving from said flask a sample of predetermined amount, a filter in said cup, a pump having an inlet communicating with said cup below said filter and an outlet communicating with said flask above said cup, and control means for said valve and said pump comprising means responsive to filling of said cup to predetermined height by said sample and effective for closing said valve and setting said pump into operation and means for stopping said pump and opening said valve at the end of a predetermined period of time of operation of said pump.

7. Apparatus for performing analytical processes comprising a specimen flask having a normally open gravity drain, a valve for closing said drain, a unitary sample cup below said drain for successively receiving from said flask a sample of predetermined amount, a filter in said cup, a pump having an inlet communicating with said cup below said filter and an outlet communicating with said flask above said cup, and control means for said valve and said pump including means responsive to filling of said cup to a predetermined extent by said sample and effective for closing said valve and setting said pump into operation, and time delay means for maintaining said valve closed and said pump in operation for a predetermined time interval to draw the sample through said filter, said pump upon expiration of said time interval being rendered inoperative and causing a portion of the filtrate to surge back into said cup and through said filter, said valve upon expiration of said time interval opening to accommodate flow of a further sample into said cup.

8. Apparatus for performing analytical processes comprising a specimen flask having a normally open gravity drain, a solenoid operated valve for closing said drain, a transparent sample cup below said drain for receiving samples from said flask, a source of light at one side of said cup, a photoelectric cell at the opposite side of said cup, means for adjusting said light source and said cell vertically relative to said cup, a filter in said cup, an electrically operated pump having an inlet communicating with said cup below said filter and an outlet communicating with said flask adjacent the upper end thereof, the solenoid of said valve and the electric operating means of said pump being in series circuit with said cell and a source of power to be energized when a beam of light emanating from said source toward said cell is cut off by the presence of a liquid sample in said cup, and a time delay device including activating means in series circuit with said cell, means activated by said activating means for establishing a power supply circuit to said solenoid and said pump operating means that by-passes said cell, and means for maintaining the latter circuit closed for a predetermined interval of time after the liquid in said cup has fallen below the level of said cell and said light source.

9. In apparatus for performing analytical processes, a specimen flask, a sample cup below said flask, a tube for delivering samples from said flask to said cup, a filter in said cup, an impeller pump having an intake connected to said cup below said filter and an outlet, a conduit extending from said outlet to said flask and a substantial distance above said cup, said pump when stopped providing for free flow of liquid from said outlet conduit to said cup, and control means responsive to filling of said cup to predetermined extent and effective for closing said tube and starting said pump and for stopping said pump and opening said tube at the end of a predetermined period of time.

10. In apparatus for performing analytical processes, a specimen flask, a sample cup below said flask, a tube for delivering samples from said flask to said cup, a filter in said cup, an impeller pump having an intake and an outlet, a conduit connecting said cup below said filter to the pump intake, a conduit extending from the pump outlet to said flask and a substantial distance above said cup, said pump when stopped providing for free flow of liquid from said outlet conduit through said intake conduit into said cup, and control means responsive to filling of said cup to predetermined extent and effective for closing said tube and starting said pump and for stopping said pump and opening said tube at the end of a predetermined period of time.

11. In apparatus for performing analytical processes a specimen flask, a sample cup below said flask, a tube for delivering samples from said flask to said cup, a filter in said cup, an impeller pump having an intake below said cup and an outlet, a conduit connecting said cup below said filter to the pump intake, a conduit extending from the pump outlet to said flask and a substantial distance above said cup, said outlet conduit being of substantially greater height than said intake conduit, and control means responsive to filling of said cup to predetermined extent and effective for closing said tube and starting said pump and for stopping said pump and opening said tube at the end of a predetermined period of time.

References Cited in the file of this patent
UNITED STATES PATENTS

| 2,091,303 | Brelsford | Aug. 31, 1937 |
| 2,099,038 | Shikles | Nov. 16, 1937 |
| 2,545,281 | Hunt | Mar. 13, 1951 |
| 2,726,936 | Bernheim | Dec. 13, 1955 |
| 2,734,377 | Traver | Feb. 14, 1956 |